United States Patent Office 2,825,728
Patented Mar. 4, 1958

2,825,728

ALKYLENE BIS BENZOXAZINE COMPOUNDS

Raymond H. Rigterink, Midland, Mich., assignor to The Dow Chemical Company, Midland, Mich., a corporation of Delaware No Drawing. Application December 12, 1956
Serial No. 627,747

6 Claims. (Cl. 260—244)

The present invention is concerned with the benzoxazine compounds having the formula $$(Z)_2=R$$

In this and succeeding formulae, R represents an alkylidene radical containing from 1 to 4 carbon atoms, inclusive, or a cyclohexylidene radical, and Z represents a radical having the structure

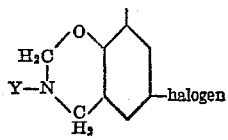

or

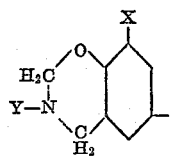

in which Y is cyclohexyl, benzyl, phenyl, halobenzyl, halophenyl or an alkyl radical containing from 1 to 12 carbon atoms, inclusive, and X is hydrogen, halogen or methyl. The term alkylidene as used in the present specification and claims refers to a divalent aliphatic radical derived from an aliphatic hydrocarbon by the removal of two hydrogen atoms from one of the carbon atoms.

The new compounds are crystalline solids or oily liquids somewhat soluble in many organic solvents such as toluene, ethyl acetate and petroleum ether and of a very low solubility in water. The compounds are particularly useful as parasiticides and are adapted to be employed as active toxic constituents of compositions for the control of many pests such as flies.

The new compounds may be prepared by causing a primary amine having the formula $YNH_2$ to react with a formaldehyde or a formaldehyde yielding substance to form an intermediate formaldehyde condensation product of the amine. The latter is then caused to react with a bisphenol compound having the formula $$(A)_2=B$$

wherein B represents an alkylidene radical containing from 1 to 4 carbon atoms, inclusive, or a cyclohexylidene radical, and A represents a radical having the structure

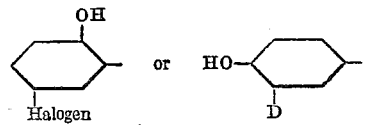

in which D is hydrogen, halogen or methyl.

In the first step of the reaction, a primary amine such as aniline, haloaniline, benzylamine, halobenzylamine cyclohexylamine, or an alkylamine is added to formaldehyde or formaldehyde yielding substance in a solvent inert under the conditions of reaction such as methanol, ethanol or dioxane. The reaction takes place smoothly at the temperature range of from 0° to 50° C. with the formation of the desired intermediate formaldehyde condensation product of the amine. The reaction is somewhat exothermic and cooling may be required to maintain temperature control. Good results are obtained when employing one molecular proportion of the amine with two molecular proportions of formaldehyde. When a formaldehyde yielding substance is used as a reactant, this substance is employed in an amount equivalent to the desired amount of formaldehyde.

In the second step of the reaction, the alkylidene bisphenol or cyclohexylidenebisphenol is added to the reaction mixture prepared as described above. In such operations, one-half molecular proportion of the bisphenol compound is employed for each molecular proportion of the primary amine used in the preparation of the intermediate formaldehyde condensation product of the amine. The reaction takes place smoothly at the temperature range of from 30° to 100° C. The desired product may precipitate from the reaction mixture during the heating period or upon cooling the mixture after completion of the reaction. The product, if a solid, is removed from the cooled mixture by filtration and purified by conventional methods such as recrystallization. The product, if an oil, may be isolated from the reaction mixture by (1) adding thereto toluene, (2) agitating the resulting heterogeneous mixture, (3) mechanically separating the aqueous and toluene fractions, and (4) distilling the toluene fraction to remove low boiling constituents and recover the desired product as a residue.

The following examples illustrate the invention, but are not to be construed as limiting:

*Example 1.—6,6'-isopropylidenebis(3-cyclohexyl-3,4-dihydro-2H-1,3-benzoxazine)*

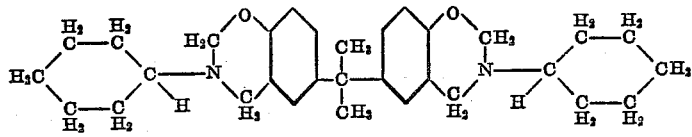

Sixty grams of paraformaldehyde (equivalent to two moles of HCHO), 1.0 gram of potassium hydroxide and 150 milliliters of methanol were mixed together and the resulting mixture heated to the boiling temperature, 65° C., to obtain a clear solution. The reaction vessel and contents were then cooled to room temperature and 1.0 mole (99 grams) of cyclohexylamine added portionwise thereto. The addition was carried out with stirring and external cooling and at a temperature of from 25° to 30° C. Upon completion of the addition, 0.5 mole (114 grams) of 4,4'-isopropylidenebisphenol was added to the mixture and the resulting mixture heated at the boiling temperature, 82–86° C., and under reflux for one hour, The reaction vessel and contents were thereafter cooled to room temperature and the reaction mixture diluted with 500 milliliters of toluene and 250 milliliters of water. Upon agitation, the diluted mixture separated into an aqueous layer and an organic layer. The latter was separated by decantation and fractionally distilled under reduced pressure to remove low boiling constituents and obtain a 6,6′-isopropylidenebis(3-cyclohexyl-3,4-dihydro-2H-1,3-benzoxazine) product as a viscous liquid. 6,6′-isopropylidenebis(3-cyclohexyl-3,4-dihydro-2H-1,3-benzoxazine) has a molecular weight of 474.7.

*Example 2.—8,8′-methylenebis(6-chloro-3,4-dihydro-3-phenyl-2H-1,3-benzoxazine)*

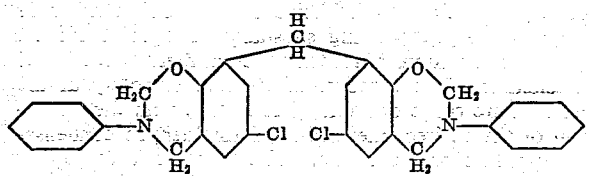

Sixty grams of paraformaldehyde (2.0 mole equivalents of HCHO) one gram of potassium hydroxide and 80 milliliters of methanol were mixed together and warmed to the boiling temperature, 65° C., to obtain a clear solution. The reaction vessel and contents were then cooled to room temperature and 1.0 mole (93 grams) of aniline added portionwise to the reaction mixture over a 15 minute period. The addition was carried out with stirring and cooling and at a temperature of from 25° to 30° C. Upon completion of the addition, 0.5 mole (123 grams) of 2,2′-methylenebis(4-chlorophenol) was added to the reaction mixture and the resulting mixture heated at the boiling temperature, 82° to 86° C., and under reflux for one hour. The reaction mixture was then cooled in an ice bath and diluted with 250 milliliters of toluene. The diluted mixture separated into aqueous and organic layers. The organic layer was separated and fractionally distilled under a reduced pressure of 10 millimeters to a final temperature of 100° C. to remove low boiling constituents and obtain an 8,8′-methylenebis(6-chloro-3,4-dihydro-3-phenyl-2H-1,3-benzoxazine) product as a crystalline residue. This product was recrystallized from ethyl acetate and found to melt at 155°–157° C.

*Example 3.—6,6′-cyclohexylidenebis(3-cyclohexyl-3,4-dihydro-2H-1,3-benzoxazine)*

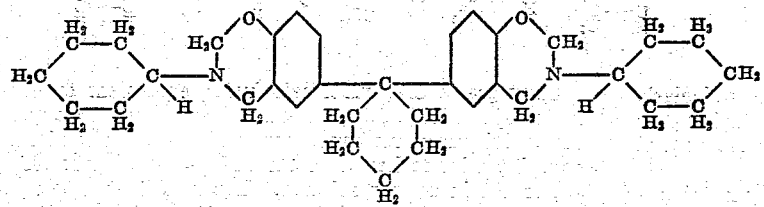

Cyclohexylamine (1.0 mole; 93 grams) was added portionwise over a 15 minute period to sixty grams of paraformaldehyde (2.0 mole equivalents of HCHO) and one gram of potassium hydroxide dispersed in 80 milliliters of methanol. The addition was carried out with stirring and cooling and at a temperature of from 25° to 35° C. Upon completion of the addition, 0.5 mole (134 grams) of 4,4′-cyclohexylidenebisphenol was added to the reaction mixture and the resulting mixture heated at the boiling temperature, 82°–86° C., and under reflux for one hour. The reaction mixture was then cooled and diluted with 250 milliliters of toluene. The diluted mixture was thereafter processed as described in Example 1 to obtain a 6,6′-cyclohexylidenebis(3-cyclohexyl-3,4-dihydro-2H-1,3-benzoxazine) product as an oily residue. 6,6′-cyclohexylidenebis(3-cyclohexyl-3,4-dihydro-2H-1,3-benzoxazine) has a molecular weight of 514.7.

*Example 4.—6,6′-isopropylidenebis[3,4-dihydro-3-(parachlorophenyl)-2H-1,3-benzoxazine]*

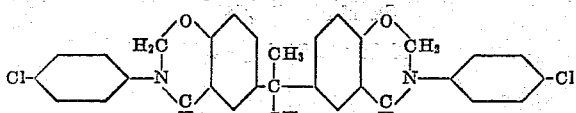

p-Chloroaniline (1.0 mole; 127 grams) was added portionwise over a 15 minute period to a mixture of 60 grams of paraformaldehyde (2.0 mole equivalents of HCHO) and one gram of potassium hydroxide dispersed in 80 milliliters of methanol. The addition was carried out with stirring and cooling and at a temperature of from 25° to 35° C. Upon completion of the addition, 0.5 mole (114 grams) of 4,4′-isopropylidenebisphenol was added to the reaction mixture and the resulting mixture heated with stirring at the boiling temperature, 82°–86° C., and under reflux for one-half hour. The reaction mixture was then cooled and diluted with 250 milliliters of toluene. The diluted mixture was thereafter processed as described in Example 2 to obtain a 6,6′-isopropylidenebis[3,4-dihydro-3-(para-chlorophenyl)-2H-1,3-benzoxazine] product as a crystalline solid. This product was recrystallized from ethyl acetate and found to melt at 150°–153° C.

*Example 5.—8,8′-methylenebis(3-normal-butyl-6-chloro-3,4-dihydro-2H-1,3-benzoxazine)*

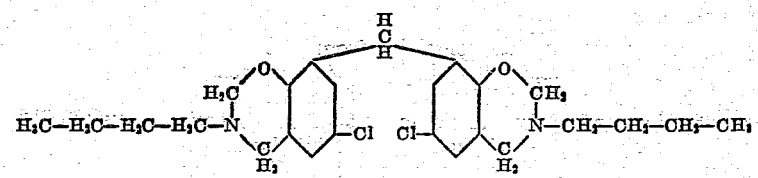

Normal-butylamine (1.0 mole; 73 grams) was added portionwise over a period of 15 minutes to sixty grams of paraformaldehyde (2.0 mole equivalents of HCHO) and one gram of potassium hydroxide dispersed in 80 milliliters of methanol. The addition was carried out with stirring and cooling and at a temperature of from 25° to 35° C. Upon completion of the addition, 0.5 mole (100 grams) of 2,2′-methylenebis(4-chlorophenol) was added portionwise to the reaction mixture and the resulting mixture heated at the boiling temperature and under reflux with stirring for one hour. The reaction mixture was thereafter processed as described in Example 2 to obtain an 8,8′-methylenebis(3-normal-butyl-6-chloro-3,4-dihydro-2H-1,3-benzoxazine) product as a crystalline solid. This product was recrystallized from ethyl acetate and found to melt at 78°–80° C.

Example 6.—8,8'-methylenebis(3-benzyl-6-chloro-3,4-dihydro-2H-1,3-benzoxazine)

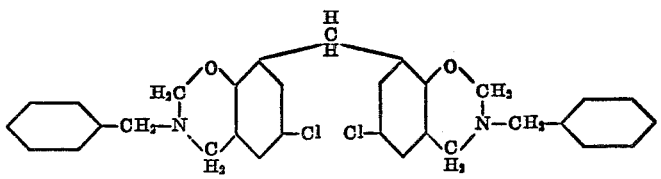

Benzylamine (1.0 mole; 106 grams) was added portionwise over a 15 minute period to sixty grams of paraformaldehyde (2.0 mole equivalents of HCHO) and one gram of potassium hydroxide dispersed in 80 milliliters of methanol. The addition was carried out with stirring and cooling and at a temperature of from 25° to 35° C. Upon completion of the addition, 0.5 mole (100 grams) of 2,2'-methylenebis(4-chlorophenol) was added portionwise to the reaction mixture and the resulting mixture heated with stirring at the boiling temperature and under reflux for one hour. The reaction mixture was thereafter processed as described in Example 2 to obtain an 8,8'-methylenebis(3-benzyl-6-chloro-3,4-dihydro-2H-1,3-benzoxazine) product as a crystalline solid. This product was recrystallized from ethyl acetate and found to melt at 119.5°–121.5° C.

Example 7.—6,6'-isopropylidenebis(8-chloro-3-cyclohexyl-3,4-dihydro-2H-1,3-benzoxazine)

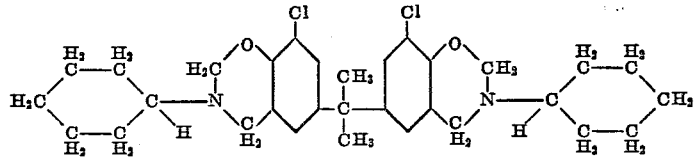

Cyclohexylamine (1.0 mole; 93 grams) was added portionwise over a 15 minute period to 60 grams of paraformaldehyde (2 more equivalents of HCHO) and one gram of potassium hydroxide dispersed in 80 milliliters of methanol. The addition was carried out with stirring and cooling and at a temperature of from 25° to 35° C. Upon completion of the addition, 0.5 mole (148.5 grams) of 4,4'isopropylidenebis (2-chlorophenol) was added portionwise to the reaction mixture and the resulting mixture heated with stirring at the boiling temperature and under reflux for one hour. The reaction mixture was thereafter processed as described in Example 1 to obtain a 6,6'-methylenebis(8-chloro-3-cyclohexyl-3,4-dihydro-2H-1,3-benzoxazine) product as a viscous oily residue. 6,6'-methylenebis(8-chloro-3-cyclohexyl-3,4-dihydro-2H-1,3-benzoxazine) has a molecular weight of 534.6.

Example 8.—6,6'-(2-butylidene)bis(3-cyclohexyl-3,4-dihydro-2H-1,3-benzoxazine)

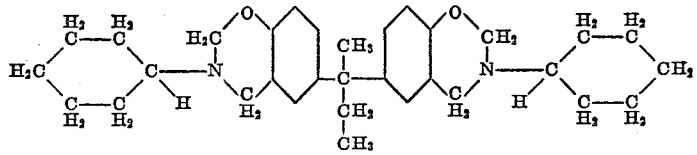

Cyclohexylamine (1.0 mole; 93 grams) was added portionwise over a 15 minute period to 60 grams of paraformaldehyde (2 mole equivalents of HCHO) and one gram of potassium hydroxide dispersed in 80 milliliters of methanol. The addition was carried out with stirring and cooling and at a temperature of from 25° to 35° C. Upon completion of the addition, 0.5 mole (120 grams) of 4,4'-(2-butylidene) bisphenol was added portionwise to the reaction mixture and the resulting mixture heated with stirring at the boiling temperature and under reflux for one hour. The reaction mixture was thereafter processed as described in Example 1 to obtain a 6,6'-(2-butylidene)bis(3,4 - dihydro - 3 - cyclohexyl - 2H - 1,3 - benzoxazine) product as a viscous oily residue 6,6'-(2-butylidene)bis(3,4 - dihydro - 3 - cyclohexyl-2H - 1,3 - benzoxazine) has a molecular weight of 488.7.

In a similar manner other benzoxazine compounds may be prepared as follows:

8,8' - methylenebis(6 - chloro - 3,4-dihydro-3-methyl-2H-1,3-benzoxazine) by reacting methylamine, formaldehyde and 2,2'-methylenebis(4-chlorophenol). This product is a white crystalline solid melting at 152°–154.5° C.

8,8' - methylenebis[6 - chloro - 3,4 - dihydro - 3 - (p-chlorophenyl)-2H-1,3-benzoxazine] by reacting p-chloroaniline formaldehyde and 2,2'-methylenebis(4-chlorophenol). This product is a light purple crystalline solid melting at 187°–190° C.

6,6' - isopropylidene(3 - cyclohexyl - 3,4 - dihydro - 8-methyl-2H-1,3-benzoxazine) by reacting cyclohexylamine, formaldehyde and 4,4'-isopropylidenebis(o-cresol). 6,6' - isopropylidenebis(3 - cyclohexyl -3,4-dihydro-8-methyl-2H-1,3-benzoxazine) has a molecular weight of 474.

8,8' - methylenebis(6 - bromo - 3,4 - dihydro - 3-normal-dodecyl-2H-1,3-benzoxazine) by reacting normal-dodecylamine, formaldehyde and 2,2'-methylenebis(4-bromophenol).

6,6' - (1 - propylidene)bis(3 - benzyl - 3,4 - dihydro-2H-1,3-benzoxazine) by reacting benzylamine, formaldehyde and 4,4'-(1-propylidene)bisphenol.

6,6' - (1 - butylidene)bis(3 - normal - butyl - 3,4-dihydro-2H-1,3-benzoxazine) by reacting normal-butylamine, formaldehyde and 4,4'-(1-butylidene)bisphenol.

6,6' - isopropylidenebis[3 - (p - bromobenzyl)3,4-dihydro-8-methyl - 2H - 1,3 - benzoxazine] by reacting p-bromobenzylamine, formaldehyde and 4,4'-isopropylidenebis(o-cresol).

8,8' - (1 - propylidene)bis(6 - bromo - 3 - cyclohexyl-3,4-dihydro-2H-1,3-benzoxazine) by reacting cyclohexylamine, formaldehyde and 2,2'-(1-propylidene)bis(4-bromophenol).

6,6' - methylenebis[3,4 - dihydro - 3 - (2,4,5 - trichlorophenyl)-2H-1,3-benzoxazine] by reacting 2,4,5-trichlorophenylamine, formaldehyde and 4,4'-methylenebisphenol.

The compounds of the present invention have been tested and found to be effective as parasiticides. In such use the compounds may be employed in admixture with a finely divided solid. Also, such mixtures may be dispersed in water with the aid of a wetting agent. In other procedures, the compounds may be employed in admixture with a liquid carrier such as water, a suitable solvent or an aqueous emulsion. In representative operations, substantially complete controls of the common house fly (*Musca domestica*) have been obtained with aqueous spray compositions containing 0.24 percent by weight of 6,6'-isopropylidenebis (3-normal-butyl-6-chloro-3,4-dihydro-2H-1,3-benzoxazine).

The alkylidenebisphenol compounds employed as starting materials as previously described may be prepared in accordance with known methods by reacting a suitable substituted phenol with a suitable ketone or aldehyde in the presence of an acid-acting condensing agent and a sulfur containing catalyst.

I claim:

1. A benzoxazine compound having the formula $$(Z)_2 = R$$

wherein R represents a member of the group consisting of the alkylidene radicals containing from 1 to 4 carbon atoms, inclusive, and a cyclohexylidene radical, and Z represents one of the radicals having the structure

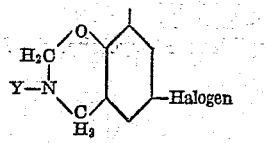

and

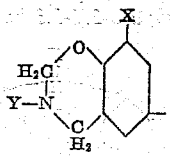

in which Y is selected from the group consisting of cyclohexyl, benzyl, phenyl, halobenzyl, halophenyl and the alkyl radicals containing from 1 to 12 carbon atoms, inclusive, and X is selected from the group consisting of hydrogen, halogen and methyl.

2. 6,6' - isopropylidenebis[3,4 - dihydro - 3 - (p-chlorophenyl)-2H-1,3-benzoxazine].

3. 6,6' - isopropylidenebis(3 - cyclohexyl - 3,4 - dihydro-2H-1,3-benzoxazine).

4. 8,8' - methylenebis(6 - chloro - 3,4 - dihydro - 3 phenyl-2H-1,3-benzoxazine).

5. 8,8' - methylenebis(3 - normal - butyl - 6 - chloro-3,4-2H-1,3-benzoxazine).

6. 8,8' - methylenebis(6 - chloro - 3,4 - dihydro - 3-methyl-2H-1,3-benzoxazine).

No references cited.

U. S. DEPARTMENT OF COMMERCE
PATENT OFFICE

CERTIFICATE OF CORRECTION

Patent No. 2,825,728    Raymond H. Rigterink    March 4, 1958

It is hereby certified that error appears in the printed specification of the above numbered patent requiring correction and that the said Letters Patent should read as corrected below.

Column 8, line 21, for "3,4-2H-1,3-benzoxazine)" read -- 3,4-dihydro-2H-1,3-benzoxazine) --.

Signed and sealed this 24th day of June 1958.

(SEAL)
Attest:
KARL H. AXLINE
Attesting Officer

ROBERT C. WATSON
Commissioner of Patents